July 9, 1968
V. MILEWSKI
3,391,438
FINE PITCH MILLING CUTTER IMPROVEMENT
Filed July 26, 1966
2 Sheets-Sheet 1
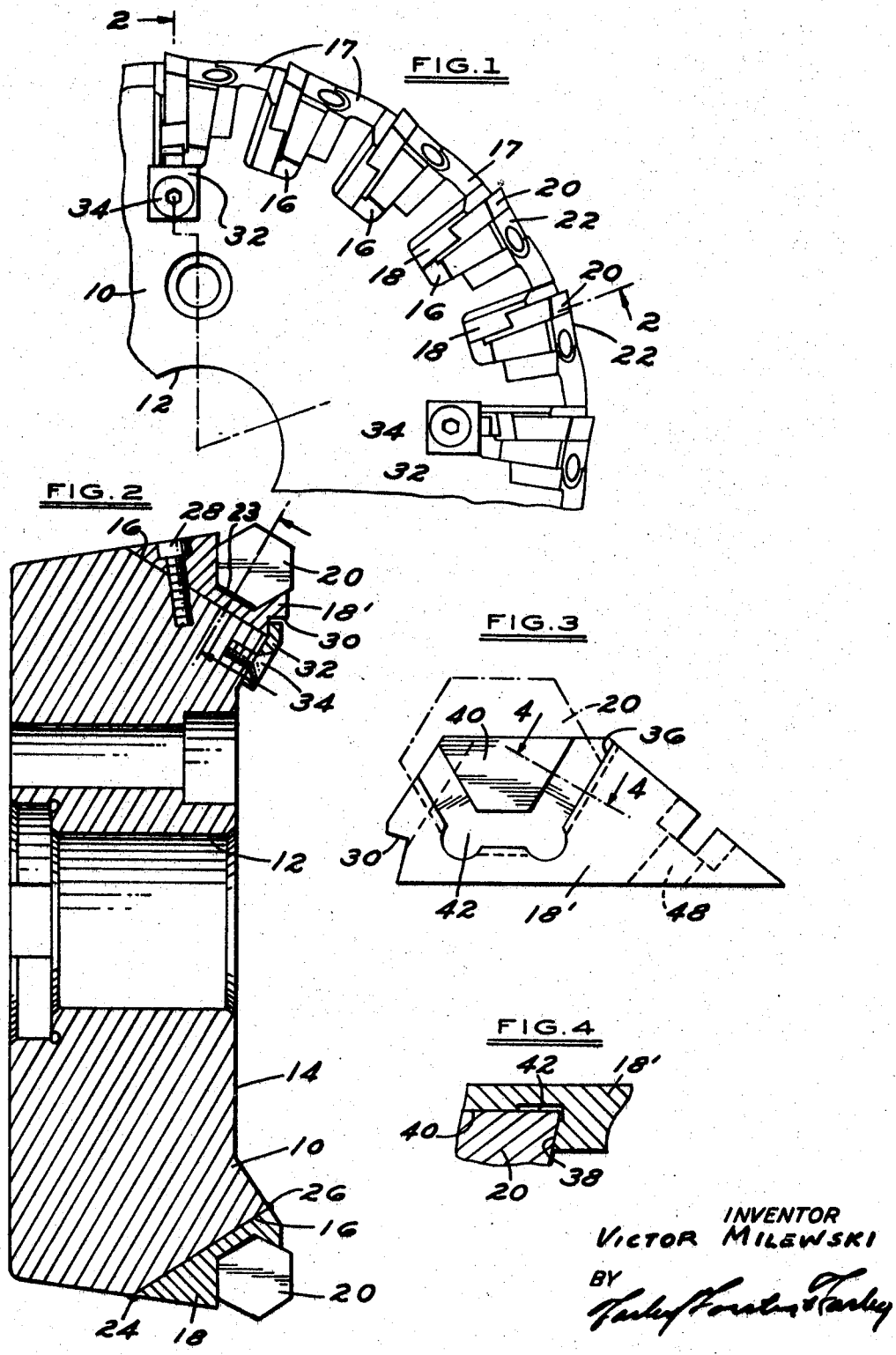
INVENTOR
VICTOR MILEWSKI
BY
ATTORNEYS

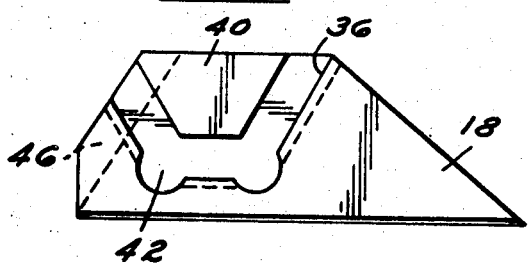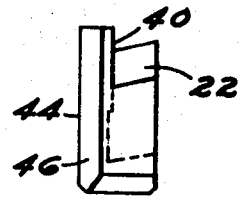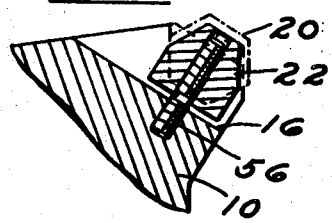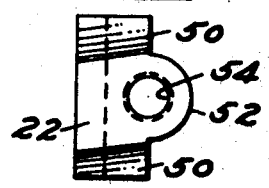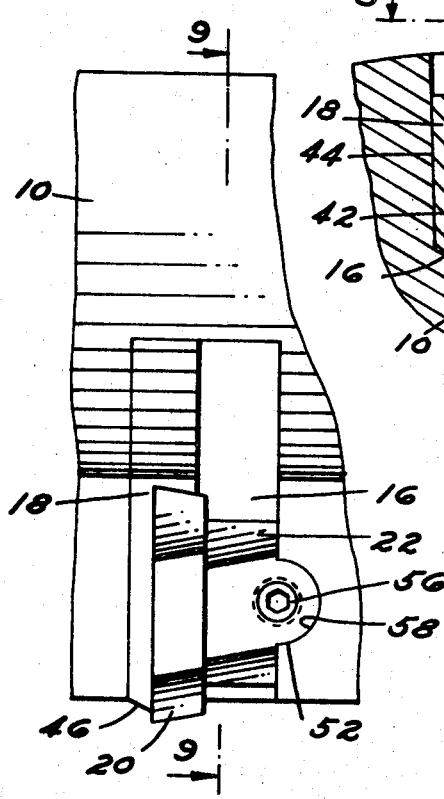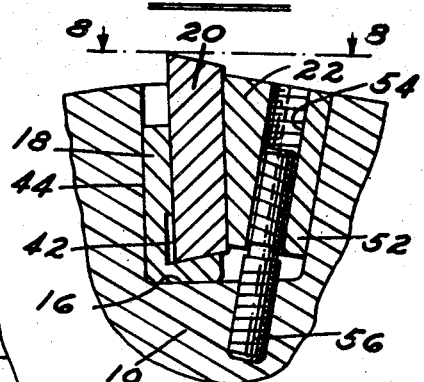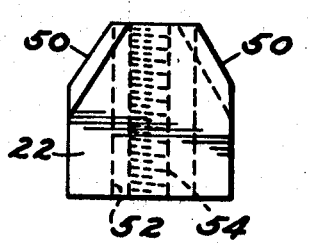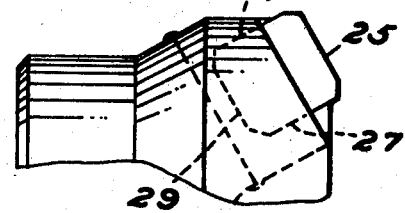

United States Patent Office 3,391,438
Patented July 9, 1968

3,391,438
FINE PITCH MILLING CUTTER IMPROVEMENT
Victor Milewski, Birmingham, Mich., assignor to The Valeron Corporation, a corporation of Michigan
Filed July 26, 1966, Ser. No. 568,035
9 Claims. (Cl. 29—105)

ABSTRACT OF THE DISCLOSURE

The present invention relates to a face milling cutter having an annular body with a plurality of closely spaced seating slots which extend through an annular rim portion at an oblique angle wherein the said slots receive seating anvils that are retained by a permanent fixing means and wherein the said anvils seat and locate cutting insert in proper cutting registry.

---

This invention relates to a face milling cutter employing a large number of closely spaced indexable cutting inserts to provide a fine pitch for relatively high rates of stock removal and relatively long life without indexing requirements.

The milling cutter of this invention is primarily characterized by an annular cutter body having closely spaced perimeter slots within which are mounted insert receptive anvils, indexable cutting inserts and cutter retaining wedges. The anvils are positively located and secured in the slots in register with the cutter body. The indexable cutting inserts are individually seated in a receptive pocket in each anvil with a side face exposed. The wedging elements engage an exposed face of an insert to seat it securely in the anvil pocket under a compressive load and for proper register and use as an integral part of the cutter body.

The wedge elements are tightened by fastener means acting both radially and axially of the cutter body for most precise and positive securement of the cutting inserts for their intended purpose.

The anvils are separate elements which are tack welded or otherwise secured in the slots of the cutter body but are replaceable if damaged.

The cutting inserts have no direct contact with the cutter body and are precisely located by the precision anvils and the tightening wedges.

The objects and advantages of the present invention will best be understood and appreciated from a detailed description of a preferred embodiment as hereinafter described with reference to the accompanying drawings:

FIG. 1 is a face elevation of a quarter-section of a face milling cutter incorporating the present invention;

FIG. 2 is a cross-sectional view of the face milling cutter taken in the planes of the radial lines 2—2 of the first drawing figures;

FIG. 3 is an enlarged view of one of the wiper insert retaining anvils;

FIG. 4 is a fragmentaried cross-sectional detail of an anvil and indexable cutter as seen in the plane of line 4—4 of FIG. 3;

FIG. 5 is an enlarged view of one of the cutting insert retaining anvils;

FIG. 6 is an end view of an anvil;

FIG. 7 is an enlarged cross-sectional view of a fragmentary part of the face milling cutter anvil, cutting insert, and differential screw retaining wedge;

FIG. 8 is a top-plan view of the fragmentary section of the milling cutter and its parts as seen in the direction of the arrow 8 in the immediately preceding drawing figure FIG. 9 is a cross-sectional view showing the wedge as seen in the plane of line 9—9 of FIG. 8;

FIGS. 10 and 11 are related detailed views of the wedge member of the assemblage; and FIG. 12 is a fragmentary view of a modified anvil adapted for square inserts.

The face milling cutter shown in the drawings include a body member 10 having a center bore 12 and a dished face 14. A series of relatively closely spaced slots 16 are provided on the periphery and each is radially oriented and angularly disposed relative to the axis of the cutter. This causes the slots to be exposed on the outer periphery of the cutter and on its inner face. This also causes the bottom wall of the slot to be disposed as an inclined plane and provides intermediate lugs 17 between each slot.

The cutter shown includes a total of twenty of the peripheral slots 16. Each accommodates an anvil 18, an indexable cutting insert 20 and a screw retained wedge 22. Every fifth slot is for a wiper insert and so includes an anvil 18' which is afforded limited adjustment.

Referring to FIG. 2, the lower part of the drawing figure shows the standard anvil 18 for retaining and locating a cutter, tack welded at 24 and 26 in its slot 16. The upper part of the drawing figure shows the anvil 18' for the cutters used as wiper inserts retained by a bolt fastener 28 and having a notch 30 at the front edge engaged by a spring clamp 32 held by a screw 34, providing a limited two-way adjustment through actuation of the bolt 28.

As best shown in FIGS. 3–5, each of the anvils 18 and 18' include a pocket 36 formed in one side face to retain the cutting inserts 20. With hexagonal shaped inserts, the pocket is similarly formed and its side walls are undercut as at 38, referring in particular to FIG. 4. It also includes a back wall land or base relief 40 for more central engagement of the inserts and to provide an annular relief area 42 protective of the cutting corner edges of the inserts. As best shown in FIG. 2, two non-adjacent edge walls of the hexagonal inserts register against corresponding walls of the anvil pocket, clearance 23 being provided relative to the intermediate side edges.

The back wall 44 of each of the anvils 18 and 18' is plane-surfaced as best shown in FIGS. 6 and 7, for close fitting engagement with one of the side walls of the slots 16. The front corner edge of each anvil is beveled back, as at 46, and only the anvils 18' for the wipers are provided with the bolt holes 48 and front corner notches 30.

Referring now to FIGS. 9–11 it will be seen that the wedges 22 are truncated near their upper end, as at 50, and formed to include a boss 52 on one side. Within the boss, and partly in the wedge, is formed a threaded bore hole 54 receptive of fastening means 56 to secure the wedge in place.

As shown in FIGS. 1 and 8, and identified in the latter, a groove 58 receptive of the boss 52 on the wedge is provided in the side wall of each of the slots 16 opposite the side wall receptive of the anvils. The wedge itself is tapered, as shown in FIG. 7, for its intended purpose and is of a size and shape for face engagement with the cutting inserts in the anvil pockets 36.

In the assembly of the parts of the face milling center, the anvils 18 are precisely located in the slot 16 on the inclined base or seat of the slots and with their plane surfaced back side 44 against the plane surface side wall of the slot. This is done by a suitable fixture with a set of master inserts held against the forward shoulder of the anvil while it is manually adjusted to bring all cutting corners of the inserts precisely to a common cutting plane at which position the wedegs are tightened and the anvils tack welded, thereby substantially eliminating the effect of any tolerance errors in the machining of the anvils. Cutting inserts 20 are then placed in the pockets of the anvils 18 and the wedges 22 are re-tightened with all inserts held against the leading walls of the anvils.

The wedges 22 are relatively positioned in the slots 16 by their bosses 52 received in the grooves 58 and are progressively tightened down by the fastening means 56 to provide a solid and secure assembly.

The anvils 18', are disposed at the quadrant positions and are retained by suitable fastener means rather than being tack welded. The spring clamp and screw retainer at the front face of the cutter are also used. Otherwise, the insert and wedge arrangement used is the same as previously mentioned.

From the foregoing, it will be appreciated that the anvils 18, as well as 18', are disposed and held on an inclined plane in the slots 16 and are positively retained in a fixed and secure position. The anvils 18, while tack welded in place, are positively located and secured to the extent necessary to resist any normal effort of dislodgement with the angle of the pocket adapted to provide a slight corner protrusion of the cutting insert as best shown in the lower insert of FIG. 2 whereas the adjustable wiper anvils are pocketed to provide a cutting edge substantially parallel to the cutting plane providing a smoothing scraping action. In use, all force imposed upon the inserts, and transmitted to the anvils, is against the inclined planes of the base of the slot in which they are located. It is also, obviously, resisted by the wedged compressive engagement of the inserts in the anvils.

In the event of serious damage, the anvils can be removed and replaced.

The wedges are likewise positively located and resist any effort of dislodgement by their engagement relative to the side wall having the receptive groove 58. Further, the fastener means 56, holding and driving the wedges home is inclined radially inward and axially in a manner for best resistance against the forces imposed on the cutting inserts in use.

The assembly disclosed has been found unquestionably strong and secure and far better than other fastener retained anvil or wedge arrangements where the slots are open on opposite faces of the cutter and no resistance to the work effort force is provided through other than the wedge engagement of the elements in the slots and the sheer resistance to the fastener means. In addition to the advantages of the inclined plane base of the slots, is the fact that the tack welding may be used for arcuate positioning, positive retainment and still allow replacement for serious damage. Every wedge engages every insert in the same manner due to its positive location. They are similarly locked and tightened down for secure retention of every insert under a like compressive load. At the same time, they may be loosened without serious difficulty to enable the inserts to be indexed or replaced as required.

Referring to FIG. 12 it will be seen that the present construction may be readily adapted to other forms of cutter inserts such as the square insert 25 shown wherein the leading edge wall 27 and adjacent edge wall 29 register against corresponding anvil wall surfaces with any clearance 31 allocated to the third edge-pocket walls.

Without further discussion, it will be appreciated that certain other variations, modifications and the like are conceivable and within the scope of this invention and that although a preferred embodiment has been specifically shown and described in detail, it has been done to illustrate the scope of the present invention without intent to unnecessarily limit the invention thereto. Accordingly, such improvements, modifications and alterations as are within the spirit of this invention and are not specifically excluded by the language of the hereinafter appended claims are to be considered as inclusive thereunder.

I claim:
1. A cutting tool comprising an annular body member having a plurality of slots formed in the outer periphery thereof and exposed on one side face thereof, each of said slots having a bottom wall surface extending through said one side face at an oblique angle relative to the axis of said annular body member, means secured in each of said slots in registry with said body member including said bottom wall and having edge faces for positively locating a cutting insert relative thereto, a cutting insert disposed in each of said slots and receptively engaged with said locating means for use, wedge means received in each of said slots and acting against the side wall forming a slot for holding said cutting insert in engagement with said locating means, wedge tightening means coacting with said body member, each of said locating means registering along said bottom wall surface with the cutter insert located therein precisely in a common cutting plane.

2. A cutting tool as set forth in claim 1 wherein said last means comprises adhering means interacting between adjacent surfaces of said body and locating means for fixedly securing said locating means in position.

3. A cutting tool as set forth in claim 2 wherein said adhering means comprise tack welding means.

4. A cutting tool as set forth in claim 1 wherein said locating means include locating surfaces for engagement by said cutting inserts limiting the radially inward-most position of said cutting inserts.

5. A cutting tool as set forth in claim 1 wherein saod cutting inserts have an indexable hexagonal configuration and wherein said locating means include angularly disposed locating surfaces for engagement by matching angularly disposed hexagonal edge surfaces of said cutting inserts.

6. A cutting tool as set forth in claim 5 wherein said angularly disposed locating surfaces limit the radially inward-most position of said cutting inserts.

7. A cutting tool as set forth in claim 5 wherein one of the hexagonal edges of each of a plurality of said cutting inserts extends at a slight angle nearly parallel to a cutting plane normal to the axis of said annular body member, the radially inward portion of said edge extending away from said cutting plane.

8. A cutting tool as set forth in claim 7 wherein at least one of said hexagonal edges is located in the cutting plane to provide a wiping action.

9. A cutting tool set forth in claim 8 wherein permanently operable mechanical adjusting means are provided for the locating means associated with said wiping cutting insert.

References Cited

UNITED STATES PATENTS

| 3,091,138 | 5/1963 | Berry | 29—105 XR |
| 3,104,453 | 9/1963 | Greenleaf | 29—105 |
| 3,116,538 | 1/1964 | Severson | 29—105 |
| 3,138,847 | 6/1964 | Berry | 29—105 |
| 3,142,111 | 7/1964 | Turner | 29—105 |
| 3,200,474 | 8/1965 | Kvalowetz | 29—105 |
| 3,217,384 | 11/1965 | Wirfelt | 29—105 |
| 3,229,350 | 1/1966 | Yogus | 29—105 |
| 3,315,332 | 4/1967 | Lowry | 29—105 |

FOREIGN PATENTS 593,425 10/1947 Great Britain.

HARRISON L. HINSON, *Primary Examiner.*

UNITED STATES PATENT OFFICE
CERTIFICATE OF CORRECTION

Patent No. 3,391,438

July 9, 1968

Victor Milewski

It is certified that error appears in the above identified patent and that said Letters Patent are hereby corrected as shown below:

Column 4, line 21, "plane." should read -- plane and permanent means for fixedly securing said locating means in position. --.

Signed and sealed this 23rd day of December 1969.

(SEAL)
Attest:

Edward M. Fletcher, Jr.
Attesting Officer

WILLIAM E. SCHUYLER, JR.
Commissioner of Patents